ROBERT F. CLINE,
STANLEY J. MILLER, INVENTORS.
WHANN & McMANIGAL
Attorneys for Applicants

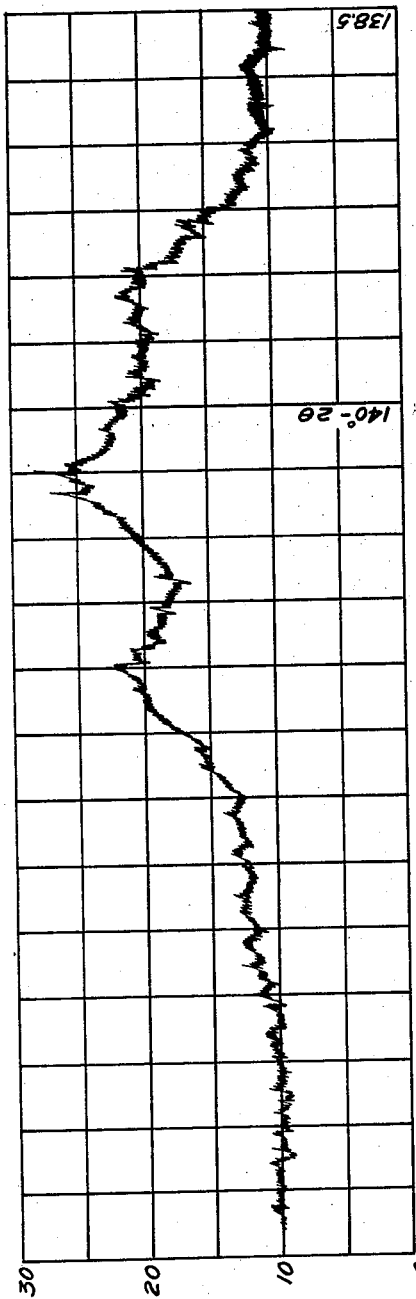
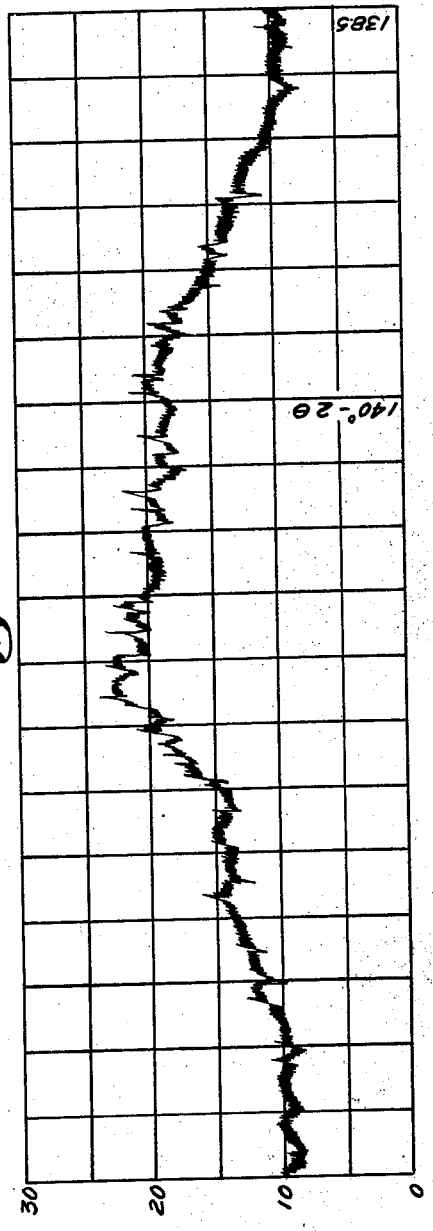
Fig. 5.
Fig. 6.
ROBERT F. CLINE,
STANLEY J. MILLER,
INVENTORS.
WHANN & McMANIGAL
Attorneys for Applicants Sept. 10, 1963    R. F. CLINE ETAL    3,103,441
CERAMIC MATERIALS HAVING FLAT TEMPERATURE CHARACTERISTICS
Filed Dec. 9, 1957    5 Sheets-Sheet 5
Fig. 10.
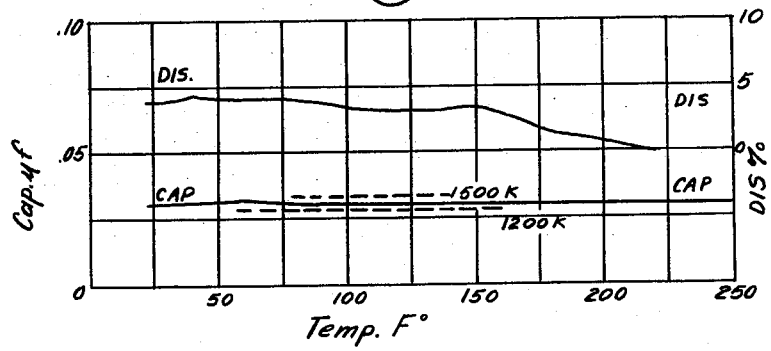
Fig. 11.
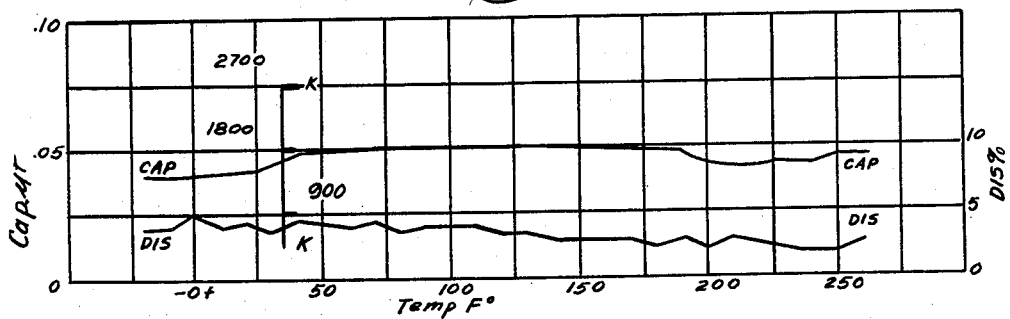
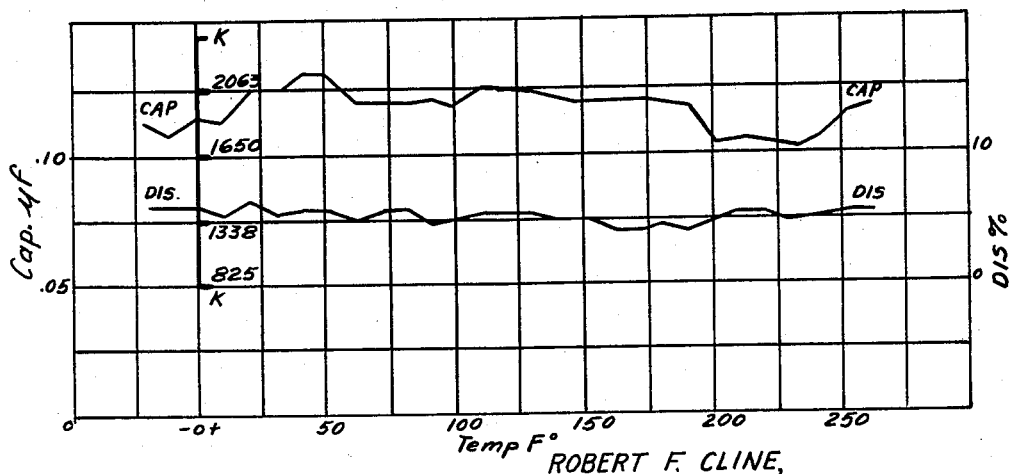
Fig. 12.
ROBERT F. CLINE,
STANLEY J. MILLER, INVENTORS.
WHANN & McMANIGAL
Attorneys for Applicants
by

United States Patent Office 3,103,441
Patented Sept. 10, 1963

3,103,441
CERAMIC MATERIALS HAVING FLAT
TEMPERATURE CHARACTERISTICS
Robert F. Cline, Whittier, and Stanley J. Miller, Los Angeles, Calif., assignors, by mesne assignments, to Gulton Industries, Inc., a corporation of New Jersey
Filed Dec. 9, 1957, Ser. No. 701,430
5 Claims. (Cl. 106—39)

This invention relates to fired barium titanate ceramic bodies having improved electrical properties particularly in that they have a flat characteristic of capacitance versus temperature but still having a high dielectric constant.

Polycrystalline bodies composed primarily of barium titanate, usually in the form resulting from a ceramic firing operation, have well known utility as electrical components suitable for both electrical and electromechanical applications. Many of these barium titanate ceramic materials have a high dielectric constant but most of them exhibit a relatively wide variation of capacitance with temperature. The primary object of this invention is to provide and to produce a barium titanate composition having a uniform temperature coefficient of capacitance over a wide useful range, i.e., a composition having a flat characteristic as between temperature and capacitance. More detailed objects will be stated presently.

Barium titanate as obtained on the commercial market shows a substantial change in capacitance with temperature. Commercial barium titanate has a major Curie point temperature where the capacitance rises to a high peak value. As this temperature is approached from the high temperature region, the crystals are of the cubic structure and begin a transition to the tetragonal form. When further cooled, the structure goes through another structure, or crystalline change, to orthorhombic near zero degrees C. This is a second Curie region. The ordinary polycrystalline barium titanate undergoes the first Curie transformation at a temperature of about 120° C. and the second transformation occurs at a temperature not far below room temperature.

The commercial barium titanate has usefully high K values in the temperature range below the major Curie point; nevertheless, it is undesirable for many applications to use it as a capacitor ceramic if the temperature range for operation extends through the Curie range. Transition through the Curie points causes a change in capacitance in the order of 6/1 and the result is that much effort has been devoted to produce a substance that would remain nearly constant in capacitance throughout a range of temperature.

The materials of this invention have various applications, as pointed out above, the advantage of the flat temperature characteristic contributing in varying degrees to the usefulness of the particular device, depending upon the application. The materials may be used in electrical condensers or in various types of electromechanical transducers. In practically all of these applications the variations in capacitance of known prior art materials encountered over the usual temperature ranges are objectionable in varying degrees. The fixed capacitance of vacuum tube circuits and connecting wiring, generally used with components such as transducers, frequently is sufficiently small that changes in capacitance of the transducer body itself with the temperature amount to a large fraction of the average capacitance over the temperature range.

Various additions to barium titanate ceramic bodies have been investigated in the prior art in efforts to secure useful modifications of the dielectric constant and other electromechanical characteristics of the material.

According to this invention, additions are made to the barium titanate ceramics to have the ultimate resultant effect of providing for a substantially flat capacitance characteristic as respect temperature. The invention is achieved by the addition to the barium titanate of substances, or materials, which have the effect of changing the location on the temperature scale of the major Curie point and the addition of other materials that have the effect of depressing the peak value of the Curie point capacitance but without appreciably altering the temperature at which it occurs. By particular combinations of additives this invention has achieved a resultant material in which the capacitance characteristic is substantially flat. The substances which have the effect of altering the position of the major Curie point include tin oxide and zirconium dioxide. Materials such as bismuth stannate have the effect of depressing the peak value of the Curie point. The effect of bismuth, which is a +3 element, is that it drastically reduces crystal size. In the form of the stannate, bismuth alone, and in combination with other tin compounds, it is able to produce ceramic bodies having high dielectric constant and with uniform electrical properties over a wide temperature range. In admixture with other +4 oxides, such as zirconium or titanium, bismuth stannate contributes to the flat characteristic of capacitance vs. temperature. The resultant material is one in which sharp thermal polymorphic changes in the crystal structure of the material are eliminated or minimized, the polycrystalline structure existing simultaneously in the cubic, tetragonal and orthorhombic states, as is evidenced by the X-ray diffraction patterns. The bismuth acts as an inhibitor substance to prevent excessive crystal growth during firing, with the result that the various crystal forms coexist in the material such that a sharp transition from one crystal form to another on temperature change is avoided. The titanium dioxide contributes to the fluxing of the ceramic material during firing. By the addition of particular percentages, or proportions, of the depressing material and shifting substance, we have provided a fired ceramic barium titanate material having a flat characteristic as pointed out above. Such material, nevertheless, retains its relatively high dielectric constant. The additions of this invention make operation possible under more varied ambient temperature conditions without the unfavorable effects otherwise normally attendant to operation at or through the transition points.

The capacitance characteristic of the material is, of course, determined from electrical tests of the material with electrodes applied on opposite flat surfaces thereof; however, the nature of the material which gives it improved electrical properties is tangibly evidenced by X-ray diffraction patterns illustrative of the crystal structure of the material. Those skilled in the art can interpret the patterns resulting from X-ray diffraction examination of material and from the height and spacing of the peaks in the pattern are able to comprehend the nature of the differing crystal structure of the material. The improved crystal structure, as demonstrated by the X-ray diffraction pattern, fortifies the evidence of improved electrical properties as obtained by electrical testing of the material.

The nature of the crystalline structure of the material of this invention will be referred to hereinafter.

In addition to the primary object stated above, it is a further object of this invention to provide a material as described having flat capacitance temperature characteristic, but also having a high insulation value, low loss factor and a high dielectric constant.

Another object of the invention is to provide a barium titanate ceramic material that can readily be fired in a ceramic kiln to yield a physically dense, non-porous, well bonded ceramic structure having the desired electrical characteristics.

Another object of the invention is to provide a material that will, when coated on two opposite faces with a conductive silver layer and energized with a voltage difference between the two silver layers, be resistant to the migration of silver ions through the ceramic to cause loss of insulation value.

Another object of the invention is to provide a ceramic material that will have a low loss characteristic through a wide range of frequencies, from low frequency, or direct current, to the high megacycle frequency range and preferably not have loss peaks at any frequency.

Another object of the invention is to provide a ceramic material which will be stable in characteristics over a long period of time.

Another object of the invention is to provide a barium titanate dielectric ceramic material having flat capacitance-temperature characteristics, the material including an additive which acts as an inhibitor to prevent excessive crystal growth, resulting in a polycrystalline structure existing simultaneously in the cubic, tetragonal and orthorhombic states.

Another object of the invention is to provide a dielectric material, as in the foregoing, comprising a barium titanate composition having minor percentages of additives selected from the oxides of titanium, tin and zirconium and including a minor percentage of bismuth compound.

Further objects and numerous advantages of the invention will become apparent from the following detailed description and annexed drawing, wherein:

Referring to FIG. 1 of the drawings, the graph shows the capacitance characteristics of ordinary barium titanate material.

FIG. 5 is a sample X-ray diffraction pattern for the material of FIG. 2 (Example A).

FIG. 6 is a sample X-ray diffraction pattern of the material of FIG. 3 (Example B).

FIG. 10 is a graph of the capacitance characteristics of sample F.

FIG. 11 is a graph of the capacitance characteristics of sample G.

FIG. 12 is a graph of the capacitance characteristics of sample H.

Figure 1:
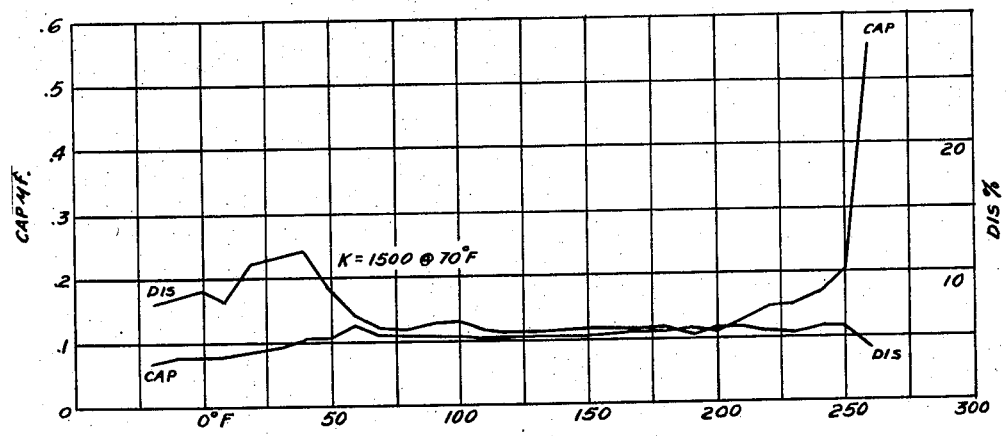

In accordance with an example of the invention, a fired ceramic dielectric body comprises barium titanate in major amount and a minor percentage of stannic oxide and bismuth stannate. In a preferred composition the proportion of stannic oxide is substantially 3 mol percent and that of the bismuth stannate is substantially 3 mol percent also. These amounts are calculated on the total weight of barium titanate which is 94 mol percent. In table II the mol percent of $Bi_2(SnO_3)_3$ is based on one-half the molecular weight or equivalent of one atom of bismuth. Materials have been found to be satisfactory within the percentage ranges shown in the tables. The significant aspects of the invention are the effect of the additives on the crystal structure in shifting and depressing the peaks as shown on the X-ray diffraction charts, and as will be discussed in connection with those patterns.

The curve marked "CAP" in the figures is the capacitance curve, while that marked "DIS" represents dissipation or electrical loss over the temperature range of the graph.

In commercial barium titanate, as pointed out in the foregoing, a peak of capacitance occurs at the major Curie temperature. The effect of the addition of the stannic oxide in the material of this invention is to shift the position on the temperature scale of this peak. The addition of the bismuth stannate, in addition to the stannic oxide, has the effect of flattening the peak without materially reducing the dielectric constant of the resulting material. The proportions of the two additives are chosen so that the peaks are shifted and depressed such that a substantially flat capacitance characteristic is achieved. The flattening is achieved without derogating from a constant and relatively high dielectric constant. The nature of the crystal structure in connection with this flattening will be discussed presently in connection with the X-ray diffraction patterns of the materials.

The green ceramic bodies may be prepared from dry comminuted powders in the proportions listed in the table in a manner conventional with barium titanate electrical ceramics, the bodies then being fired using conventional techniques. When barium titanate ceramics are prepared for use in transducers it is often desirable to form the ceramic in uniformly thin films. The ceramics of this invention may be prepared in accordance with these known techniques of the prior art, such as are disclosed in the patents of Wainer No. 2,399,082, Howatt No. 2,486,410 and No. 2,582,993, or Lies No. 2,539,446. For preparing the materials in very uniformly thin sheets or films a process or technique of casting onto a moving metal belt is preferred.

For various applications it is desired that the ceramics be in uniformly thin sheets. For successful utilization of the ceramics in thin sheets in various electrical applications, the process outlined below is preferred. This process has resulted in successful production of ceramics in uniformly thin sheets which met all of the necessary requirements, i.e., these ceramics were satisfactory in all respects, including that they could readily be fired in a ceramic kiln to yield a physically dense, non-porous, well bonded ceramic structure having the desired electrical properties and physical characteristics. The electrical properties in these particular ceramics were, of course, primarily the fact that the ceramic displayed satisfactory characteristics as respects capacitance and dielectric constant vs. temperature. These characteristics were substantially flat as described herein.

In preparing the compositions of this invention, the ingredients listed in the foregoing table in the form of comminuted powders were mixed into an intimate, thoroughly dispersed slurry of suitable resinous temporary binder. The resinous temporary binder comprised polymerized turpentine and methyl methacrylate dissolved in the ethylene dichloride. The dry powders were mixed into the slurry of resinous binder to yield a slurry having a uniform distribution after 20 to 50 hours of mixing in a ball mill. The length of time required for mixing will vary with temperature and the viscosity of the slurry. The viscosity is selected according to the thickness desired in the finished ware and the mills can be kept warm, say, in the range of 80° F. to 100° F., to assure good fluidity. It was found that twenty-four hours of milling yielded good results with the ball mill containing grinding media of alumina rods. A porcelain mill was used in preference to metal to avoid unnecessary metallic contamination. The small amount of alumina and $SiO_2$ seemed to not disturb the desired characteristics. The ethylene dichloride solvent is mixed in an amount to yield the consistency of mix desired. This may be arrived at by a certain amount of experimenting with the casting machine operation and temperature to yield the required thickness of cast material.

The viscosity, after milling, could be checked with a viscosimeter and if necessary adjusted with the addition or removal of solvent (ethylene dichloride) to obtain the correct value for the thickness of ware desired. The removal of solvent was accomplished by reducing pressure and evaporating at room temperature.

The ball mill was then conveyed to the casting machine of a type shown in the earlier application of Crownover, Serial No. 425,664, filed April 26, 1954. The material might be cast on a horizontal moving belt; however, in this particular example the ware was cast into a thin flexible sheet by forming on an inclined, moving steel belt which passed through a warmed oven to evaporate the solvent and complete the cure of the resin. A silicone parting compound on the belt permitted the cured film to be removed over a separation blade. By this means ware could be produced in thickness of the order of $2 \times 10^{-3}$ inch to $20 \times 10^{-3}$ inch. The thickness, of course, was a function of slurry viscosity, belt angle and belt speed. The casting procedure produced a thin, strong, flexible sheet of "greenware" of unfired ceramic.

The long strip of flexible ware called "greenware" was easily cut by using a punch and die, into the desired size of length and width, say ¾" wide by 4" long which was one size selected for a specific application.

It is possible at this stage to store the greenware in these strips for some considerable time prior to cutting, if desired. The one precaution that must be taken is to maintain an atmosphere of the solvent to prevent the resinous temporary binder from becoming too hard and brittle.

Next, the ware is loaded onto supporting plates, or batts, of fused, stabilized zirconia, on which the ware is fired in a ceramic kiln to a high temperature in the range of 2380° F.

The firing operation is a very critical part of the process in order to produce all the desired final physical and electrical characteristics. It is necessary to provide a preheating condition to allow the temporary binder or resin to burn off around 600–1200° F. and then to heat the ware uniformly to the lowest possible temperature consistent with sufficient crystal formation to provide a mechanically well-bonded and sealed structure and to prevent excessive loss of additives by evaporation. Excessive heating or heating for too long a time tended to form crystals larger than desired, with a resultant degradation of the electrical properties.

It was found that either a batch kiln or a tunnel kiln could be used with success provided the heating rates, cooling rate and atmospheric conditions were maintained within the correct tolerances.

In a specific example of the preparation of one of the compositions of this invention (Example A), a commercial barium titanate, stannic oxide and bismuth stannate in the form of dry, fine comminuted pure powders were mixed in proportions given in Table I with the resinous binder to form a slurry by ball milling the mixture in a porcelain ball mill with alumina rods for twenty-four hours. The weight of methyl methacrylate and polymerized turpentine was 315 g., and the weight of solvent in the original mixture was 935 g. The temporary resinous binder was a commercial product known as "Dekophane." A weight of 900 g. of resin was used comprising 315 g. of solids and 585 g. of solvent to which was added 350 g. of solvent. The ratio of methyl metharcrylate and polymerized turpentine in Dekophane was not known. The viscosity of the slurry was adjusted slightly by adding solvent or evaporating solvent so that the temperature used for preparing a film, or sheet, a thickness was obtained between the order of $2 \times 10^{-3}$ inch to $20 \times 10^{-3}$ inch. The slurry was cast in the casting machine, as described, and the reservoir, or hopper, of the casting machine was filled to a level such that at the viscosity of the slurry a film was formed within the thickness set forth above.

The drying oven of the casting machine was held at a temperature of from 100° F. to 120° F. and the film passed through during a period of thirty minutes, which was sufficient to evaporate the solvent at a rate which permitted curing without producing bubbles and blisters in the ware and yet adequately dried the material. The resulting green ware was then cut, as described, and fired in a ceramic kiln. The ware was heated in the kiln at a rate of 120° F./hour up to 1200° F. to burn off the temporary binder in a uniform manner. From 1200° F. the ware was heated to 1700° F. at a rate of 125° F./hour and held at 1700° F. for 8½ hours. From this temperature the ware was then heated to 2380–2390° F. in five hours and held for one-half hour. The kiln was then cooled to a temperature of 600° F. in ten hours before the door was opened.

The resulting fired ware was analyzed in many ways. A suitable conducting layer of silver was applied to the pieces of ceramic as a silver frit fired at approximately 1300° F. Other conductive coatings were also used, such as copper, aluminum, gold and some others applied by a vacuum evaporation process. The specimen could then be measured for capacitance to determine its dielectric constant. This was done over a range of temperature to compare the capacitance curve of this material with that of other substances commonly used in the industry, as illustrated in the figures. Loss factor was also measured over the same temperature range.

Another analysis consisted of microscopic examination of the ceramic as fired to determine the crystal size for judging the degree of firing. A uniform finely crystalline structure was desired.

Also, X-ray diffraction measurements were made to indicate the crystal lattice spacing and the amount of departure from a cubic crystal characteristic. X-ray diffraction charts were obtained from a sample of ceramic as fired with no conductive coating on its flat surfaces and corresponding measurements were made with the surfaces coated with a layer of conductive graphite and voltage applied between the two conductive faces. Changes in the intensity of chart peaks were related to the physical motion of the ceramic as an electrostrictive or piezoelectric substance and thereby related to the loss factor of the material as a capacitor. It was desirable to keep this effect as small as possible for a high quality capacitor.

It was found that relatively small amounts of addition agents could make a very large change in characteristics. Consequently, for optimum results it was found that a relatively small range of composition values could be used. It was also learned that certain rules governed the modification of the composition by various addition agents. By applying these rules it was found possible to use a different agent or combination of agents to obtain similar results.

The table of compositions referred to in the foregoing shows those compositions found satisfactory for purposes of this invention. For optimum results the ranges of proportions of constituents are those shown.

FIG. 1 is a characteristic curve of dielectric constant vs. temperature for commercial barium titanate. As will be observed, this curve shows a change in capacitance with temperature from −20° F. to +260° F. The Curie points of this material and the transitions through them and changes in the crystal structure have been discussed in the foregoing. FIG. 1 also shows the loss curve for this material.

Figure 2:
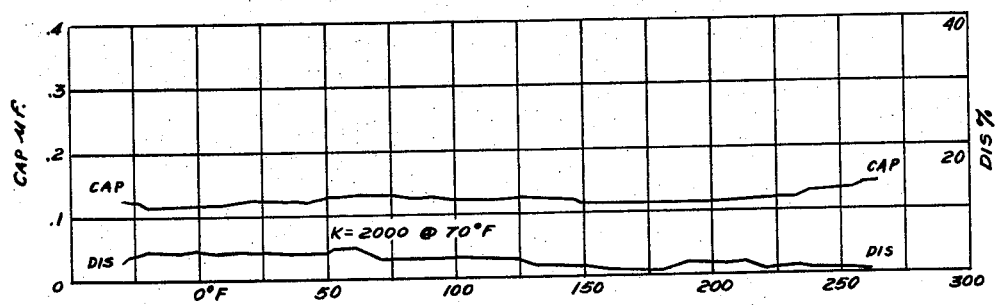
FIG. 2 is a similar graph for Example A of this invention.

FIG. 2 shows a characteristic curve of dielectric constant vs. temperature, for example, A of the table of compositions. It will be noted that there are wide excursions in the characteristics of the commercial barium titanate which contrast noticeably with the more smooth and flat characteristic of the composition of this invention. The relatively high dielectric constant, with the composition of this invention and its uniformity over a wide temperature range, makes the material highly useful for capacitors in many applications where it is desirable to eliminate temperature compensating components.

It will be noted that there is a relatively low loss factor in the material of FIG. 2 and the curve is substantially flat along with the capacitance characteristic.

Figure 3:
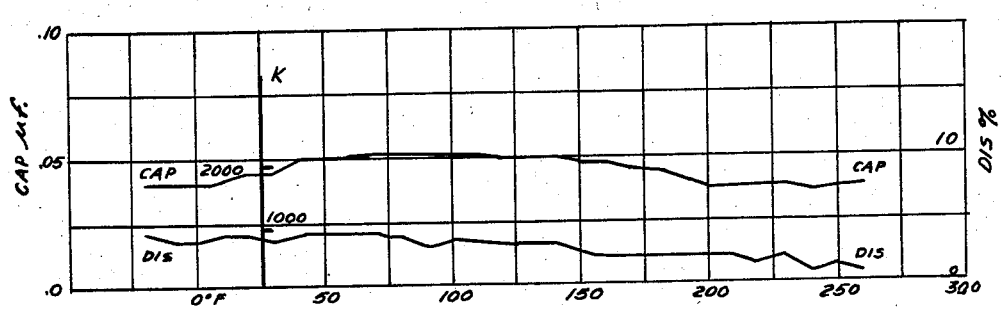
FIG. 3 is a similar graph for Example B of this invention.

FIG. 3 is a graph of similar curves of a composition (Example B) having in it zirconium dioxide as an additive, along with the bismuth stannate. It will be observed that these curves are also substantially flat, being comparable to those of FIG. 2.

Figure 4:
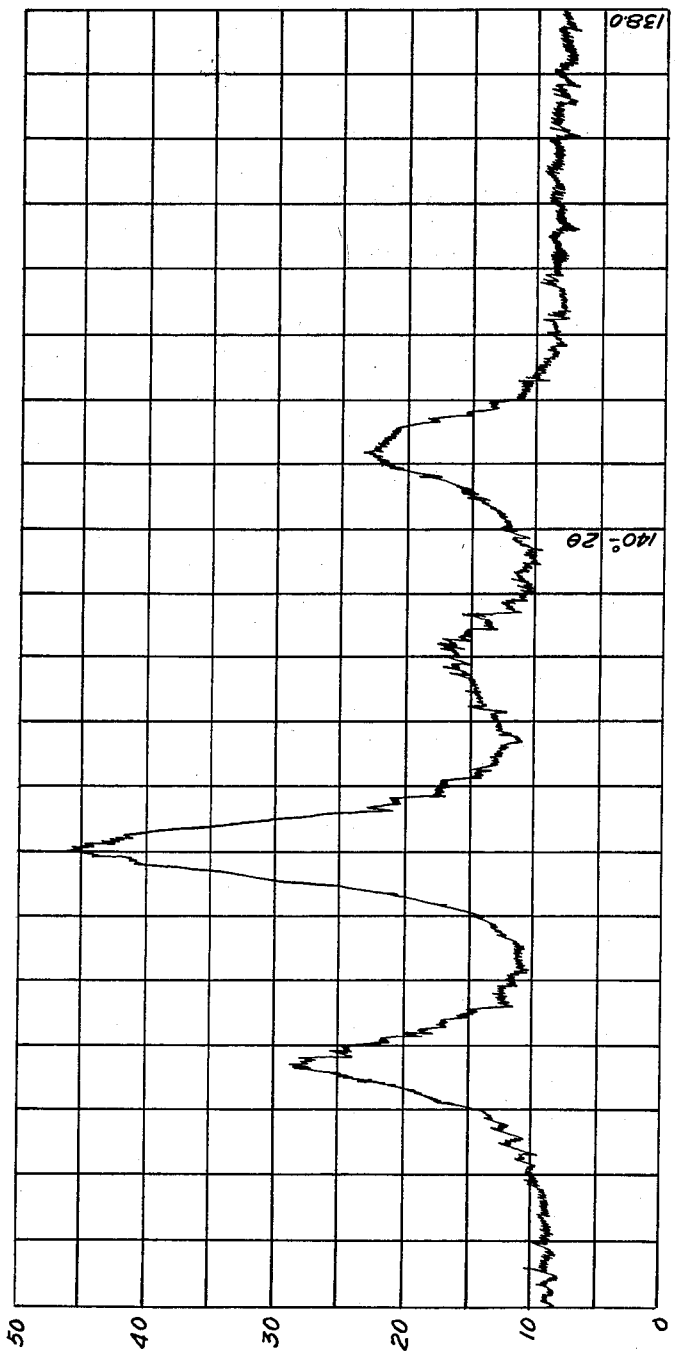
FIG. 4 is an X-ray diffraction pattern for material which is substantially that represented by FIG. 1, i.e., ordinary barium titanate.
Figure 7:
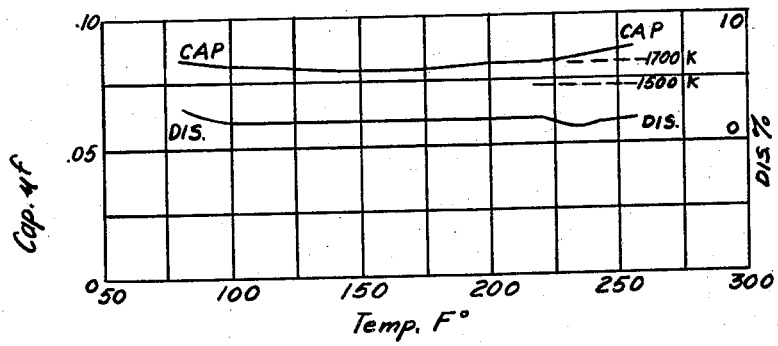
FIG. 7 is a graph of the capacitance characteristics of sample C.
Figure 8:
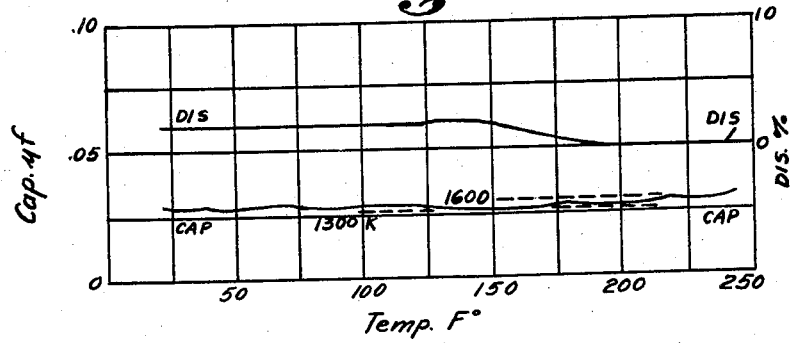
FIG. 8 is a graph of the capacitance characteristics of sample D.
Figure 9:
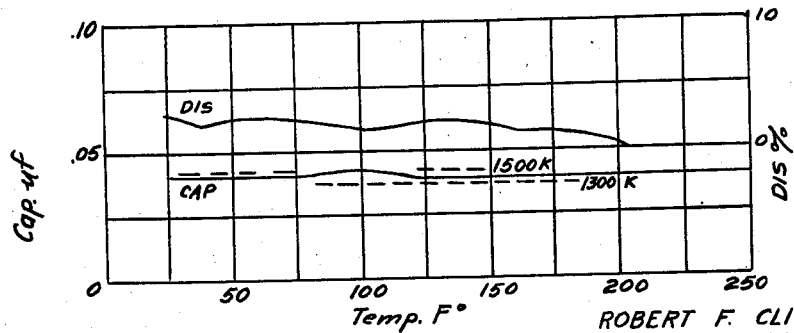
FIG. 9 is a graph of the capacitance characteristics of sample E.

As pointed out in the foregoing, X-ray diffraction studies were made of commercial barium titanate and also the compositions of this invention and samples of the X-ray diffraction patterns are shown in FIGS. 4, 5 and 6 corresponding to the materials of FIGS. 1, 2 and 3 respectively. Referring to FIG. 4, it will be observed that this X-ray diffraction pattern for ordinary barium titanate, shows four very well-defined peaks in the pattern. The crystal structure of this material is tetragonal and the highest peak represents the shorter dimension of the crystals in the crystalline structure. The farthest peak to the right represents the longer dimension of this crystal structure and the spacing between these peaks indicates the difference between these dimensions. Thus, the X-ray diffraction patterns, when properly interpreted, reveal the type of crystal structure existing in the material and the effect upon the crystal structure of the additives.

Referring to FIG. 5 of the drawings, this figure represents a sample of the X-ray diffraction pattern for the material represented in FIG. 2. It will be observed that this pattern is characterized by a noticeable absence of comparable well-defined peaks, such as are present in FIG. 4. It can be seen, therefore, that in this material there are not comparable sharp changes in crystal structure so as to produce the same well-defined peaks, and as a result of this the material has the electrical characteristics as exhibited in FIG. 2.

Referring to FIG. 6 of the drawings, this is a sample of an X-ray diffraction pattern for the material represented in FIG. 3. It will be observed that this pattern exhibits some peaks but not nearly as sharp and well-defined as those of FIG. 4, and, furthermore, the spacing is different. This illustrates the absence of sharp crystal changes, or transformations, similarly as exhibited in FIG. 5, but not to quite the same extent.

From the foregoing it is apparent that from the X-ray diffraction studies of the materials, one may comprehend the nature of the crystal structures and transformations therein. These patterns substantiate the fact of the improved electrical characteristics as exhibited in the other figures, and make possible improved comprehension of the nature of the materials.

FIGS. 7 through 12 are graphs of the electrical capacitance characteristics of the Examples C through H, discussed above. A comparison of these curves with the curve for ordinary barium titanate illustrates the more noticeably smooth and flat characteristic of the compositions of this invention. The curves illustrating the electrical characteristics of the material taken with the representative X-ray diffraction patterns properly interpreted, illustrate the novelty and usefulness of the invention and its value as an electrical capacitor having suitably high dielectric constant but still not having a wide variation of capacitance with temperature.

The use of the term "consisting essentially of" in the claims is not intended to exclude the possibility of small amounts of impurities present in the material in an amount of the order of 2% or less; such impurities may be present in the materials utilized as they are obtained commercially, or, in fact, such impurities may be deliberately added to assist in providing a ceramic bond.

The foregoing disclosure is illustrative of preferred forms of our invention, and is to be interpreted in an illustrative rather than a limiting sense. Variations and modifications of the invention may occur to and be adopted by those skilled in the art, all falling within the realm and scope of the claims appended hereto.

TABLE I

*Examples of Slip Mixtures*

[Parts by weight]

| Example | $BaTiO_3$ | $SnO_2$ | $ZrO_2$ | $Bi_2(SnO_3)_3$ | Resin | Solvent |
|---|---|---|---|---|---|---|
| A | 925.0 | 18.5 | | 56.2 | 900 | 350 |
| B | 925.0 | | 15.2 | 59.0 | 900 | 430 |
| C | 905.0 | 18.1 | | 36.7 | 720 | 432 |
| D | 888.8 | 18.1 | | 64.4 | 728 | 438 |

TABLE II

[Mol and weight percents]

| Example | $BaTiO_3$, Mol percent | $TiO_2$ | | $SnO_2$ | | $ZrO_2$ | | $½(Bi_2(SnO_3)_3)$ | |
|---|---|---|---|---|---|---|---|---|---|
| | | Mol Percent | Wt. Percent | Mol Percent | Wt. Percent | Mol Percent | Wt. Percent | Mol Percent | Wt. Percent |
| A | 94 | | | 3 | 1.85 | | | 3 | 5.62 |
| B | 94 | | | | | 3 | 1.52 | 3 | 5.9 |
| C | 95 | | | 3 | 2.0 | | | 2 | 4.06 |
| D | 94.5 | | | 3 | 1.86 | | | 3.5 | 6.63 |
| E | 93 | | | 3 | 1.86 | | | 4 | 7.5 |
| F | 94 | | | 2 | 1.26 | | | 4 | 7.6 |
| G | 94 | 1 | 0.32 | 1 | 0.62 | 1 | 0.5 | 3 | 5.91 |
| H | 93 | 2 | 0.68 | | | 2 | 1.04 | 3 | 5.87 |
| I | 92 | 2 | 0.68 | | | 3 | 1.58 | 3 | 5.88 |
| J | 93 | 1 | 0.34 | | | 3 | 1.57 | 3 | 5.86 |

We claim:

1. A dielectric material consisting essentially of barium titanate, approximately 1 to 3 mol percent zirconium dioxide, approximately 2 to 4 mol percent bismuth stannate and 1 to 2 mol percent titanium dioxide.

2. A dielectric body consisting essentially of barium titanate, amounts of zirconium dioxide and titanium dioxide of 1 to 3 mol percent each and an amount of bismuth stannate of 2 to 4 mol percent.

3. A dielectric body consisting essentially of barium titanate and amounts of zirconium dioxide and bismuth stannate together being equivalent to approximately 3 to 7 mol percent and one to two mol percent of titanium dioxide, said zirconium dioxide and bismuth stannate each being present in amounts of at least 1 mol percent.

4. A dielectric composition consisting essentially of barium titanate in 1 to 3 mol percentages each of stannic oxide and zirconium dioxide, 1 to 3 mol percentage of bismuth stannate, and 1 to 2 mol percentage of titanium dioxide.

5. A barium titanate dielectric material adapted for use in transducers, said material having a polycrystalline structure of the barium titanate normally existing simultaneously in both the cubic and tetragonal states, and containing approximately one to three mol percent zirconium dioxide, approximately two to four mol percent bismuth stannate and one to two mol percent titanium dioxide.

(References on following page)

References Cited in the file of this patent

UNITED STATES PATENTS

| | | |
|---|---|---|
| 2,533,140 | Rodriguez | Dec. 5, 1950 |
| 2,626,220 | Thurnauer et al. | Jan. 20, 1953 |
| 2,658,833 | Coffeen et al. | Nov. 10, 1953 |
| 2,708,243 | Brajer | May 10, 1955 |
| 2,908,579 | Nelson et al. | Oct. 13, 1959 |

FOREIGN PATENTS

| | | |
|---|---|---|
| 574,577 | Great Britain | Jan. 11, 1946 |

OTHER REFERENCES

Ceramics A Symposium, pub. by British Ceramic Society, Stoke-in-Trent (1953), pages 272 and 275.

Baldwin: "How to Use Electronic Ceramics Better," Ceramic Industry, August 1958 (pages 88–92).